United States Patent [19]

Barner et al.

[11] Patent Number: 4,733,329

[45] Date of Patent: Mar. 22, 1988

[54] THREE-PHASE LOAD CENTER

[75] Inventors: Gregory P. Barner, Atlanta; Drew S. Hancock, Marietta, both of Ga.

[73] Assignee: Siemens Energy & Automation, Atlanta, Ga.

[21] Appl. No.: 926,008

[22] Filed: Oct. 31, 1986

[51] Int. Cl.⁴ .................. H02B 1/04; H05K 7/20
[52] U.S. Cl. .................. 361/355; 174/16 B; 361/361; 361/379; 361/383
[58] Field of Search .................. 174/16 B; 339/198 N; 361/382, 383, 384, 346, 353, 355, 358, 361, 363, 376, 379

[56] References Cited

U.S. PATENT DOCUMENTS

| | | |
|---|---|---|
| 2,738,445 | 3/1956 | Hammerly et al. . |
| 2,905,796 | 3/1952 | Fleming . |
| 2,986,676 | 3/1966 | Edmunds . |
| 3,243,663 | 3/1966 | Rowe . |
| 3,309,580 | 3/1967 | Jacobs et al. . |
| 3,375,411 | 3/1968 | Mrowka . |
| 3,404,315 | 10/1968 | Jacobs et al. . |
| 3,411,042 | 11/1968 | Klein . |
| 3,588,620 | 6/1971 | Wasileski ..................... 361/363 |
| 3,858,092 | 12/1974 | Olashaw et al. .................. 361/346 |
| 4,142,225 | 2/1979 | Diersing et al. . |
| 4,153,318 | 5/1979 | Bishop et al. . |
| 4,251,851 | 2/1981 | Diersing et al. . |
| 4,301,493 | 11/1981 | Schweikle et al. . |
| 4,449,296 | 5/1984 | Luke et al. . |
| 4,536,823 | 8/1985 | Ingram et al. . |

Primary Examiner—A. D. Pellinen
Assistant Examiner—Gregory D. Thompson
Attorney, Agent, or Firm—James G. Morrow; John L. James

[57] ABSTRACT

A three-phase load center which has a base pan including a first and a second bus bar for a first and a second phase. The bus bars are positioned on the top surface of the base pan. A third bar for a third phase is positioned beneath the base pan such that the bus bar is in contact with the bottom surface of the base pan. An insulator is connected to the base pan such that the third bus bar lies between the base pan and the insulator. The base pan and the third bus bar are each provided with ribs and grooves. These ribs and grooves cooperate to form ventilation passageways.

10 Claims, 6 Drawing Figures

THREE-PHASE LOAD CENTER

CROSS REFERENCE TO RELATED APPLICATIONS

This application incorporates by reference the co-pending patent application entitled "Extruded Three-Phase Pan Configuration For A Load Center" having Ser. No. 06/925,996.

BACKGROUND OF THE INVENTION

This invention relates generally to three-phase load centers and more particularly to the construction and placement of bus bars in three-phase load centers to save space.

There are numerous ways to construct load centers which are to be used for heavy industrial applications where the size of a load center is not a limiting factor. However, in light industrial and residential applications, there are limitations on the size of a load center. For example, in residential applications, it is desirable to place the load center in a wall cavity which typically is formed between wall studs which are spaced apart about 16" center to center. Likewise, in light industrial applications it is also desirable to place the load center in a wall cavity where the wall has a nominal depth of approximately 4 to 4½" or so.

In the past, the bus bars in a load center and the circuit breaker plug-in units were connected to the bus bars by bolts or screws. This was feasible since the bus bars were constructed of heavy duty copper which has a square or rectangular cross-sectional configuration thick enough to accept bolts or screws. The bus bars were massive. The mass was required to minimize a load current density thereby maintaining a lower operating temperature of the bus bars. By making the bus bars long enough, the temperature stays low enough that the bus bars can be encapsulated in insulating material which reduces the space required between the bus bars and the metal enclosure of the load center. Also, where insulation is used on the bus bars, it is necessary to increase the mass of the bus bars to compensate for the poor heat transmission accompanied by insulation. Needless to say, the massive conductors required a great deal of conducting material such as copper which increases the expense of the load center. Also, circuit breaker plug-in units were attached by screws or bolts which is a labor intensive operation furthe increasing the cost of a load center. To minimize manufacturing costs, it is advantageous to use an insulative molded or extruded base pan upon which to mount the bus bars for the load center.

The modern molded or extruded base pan eliminates the need for many fabricated components and reduces assembly time. One such extruded base pan is disclosed in U.S. Pat. No. 4,449,296 which issued May 22, 1984 to Roger D. Luke and John M. Rhodes for "Method of Forming Electric Distribution Panel". The construction disclosed therein uses bus bars which are not square or rectangular in cross-sectional configuration but more closely resemble a flat piece of metal. The flat piece of metal is much easier to use in the manufacturing process than a rigid rectangular metal bar and reduces manufacturing costs. However, the structure illustrated in U.S. Pat. No. 4,449,296 is for a single phase load center; thus, it will be appreciated that it would be highly desirable to provide a three-phase load center which utilizes an extruded base pan and bus bars constructed of flat pieces of metal.

Naturally, as thin flat pieces of metal are incorporated into load centers for bus bars, the cross-sectional area of the bus bar decreases which increases the current density thereby generating more heat and becoming a limiting factor in the design of the load center. Thus, if flat bus bars are used, the heat must be eliminated in some manner. Typically, the heat is eliminated by increasing the spacing in the load center enclosure to foster the circulation of air for cooling. Naturally, this increases the depth of the load center so that it will not protrude beyond the wall cavity which is undesirable. While the insulative base pan does much to reduce the depth of the load center by eliminating the need for some spacers and insulators, an insulative pan is not enough. Accordingly, it will be appreciated that it will be highly desirable to provide a three-phase load center for residential and light industrial applications which has a shallow depth and is easy to manufacture and assemble.

Accordingly, it is an object of the present invention to provide a three-phase load center which has a shallow depth.

Another object of the invention is to provide a three-phase load center which is easy to manufacture and assemble.

Another object of the invention is to provide a load center which provides a means for cooling.

SUMMARY OF THE INVENTION

Briefly stated, in accordance with one aspect of the invention, the foregoing objects are achieved by providing a three-phase load center which includes an insulative base pan having a top surface and a bottom surface and having a slot and first and second openings. A first bus bar has an upstanding stab and an opening and is positioned on the top surface of the base pan with the first bus bar opening aligned with the second bus bar opening. A second bus bar also has an upstanding stab and an opening and is positioned on the top surface of the base pan with the second base bar opening aligned with the second opening of the base pan. The first and second bars are electrically isolated from one another and from a third bus bar which has a periphery and an upstanding stab and is positioned on the bottom surface of the base pan with the stab extending through the slot. An insulator has first and second openings aligned with the first and second base pan openings and is positioned in contact with the third bus bar and extends beyond the periphery of the third bus bar. Fastening means extend through the aligned openings forming a unitary structure.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiments taken in conjunction with the accompanying drawings in which:

DESCRIPTION OF THE PREFERRED EMBODIMENTS

Figure 1:
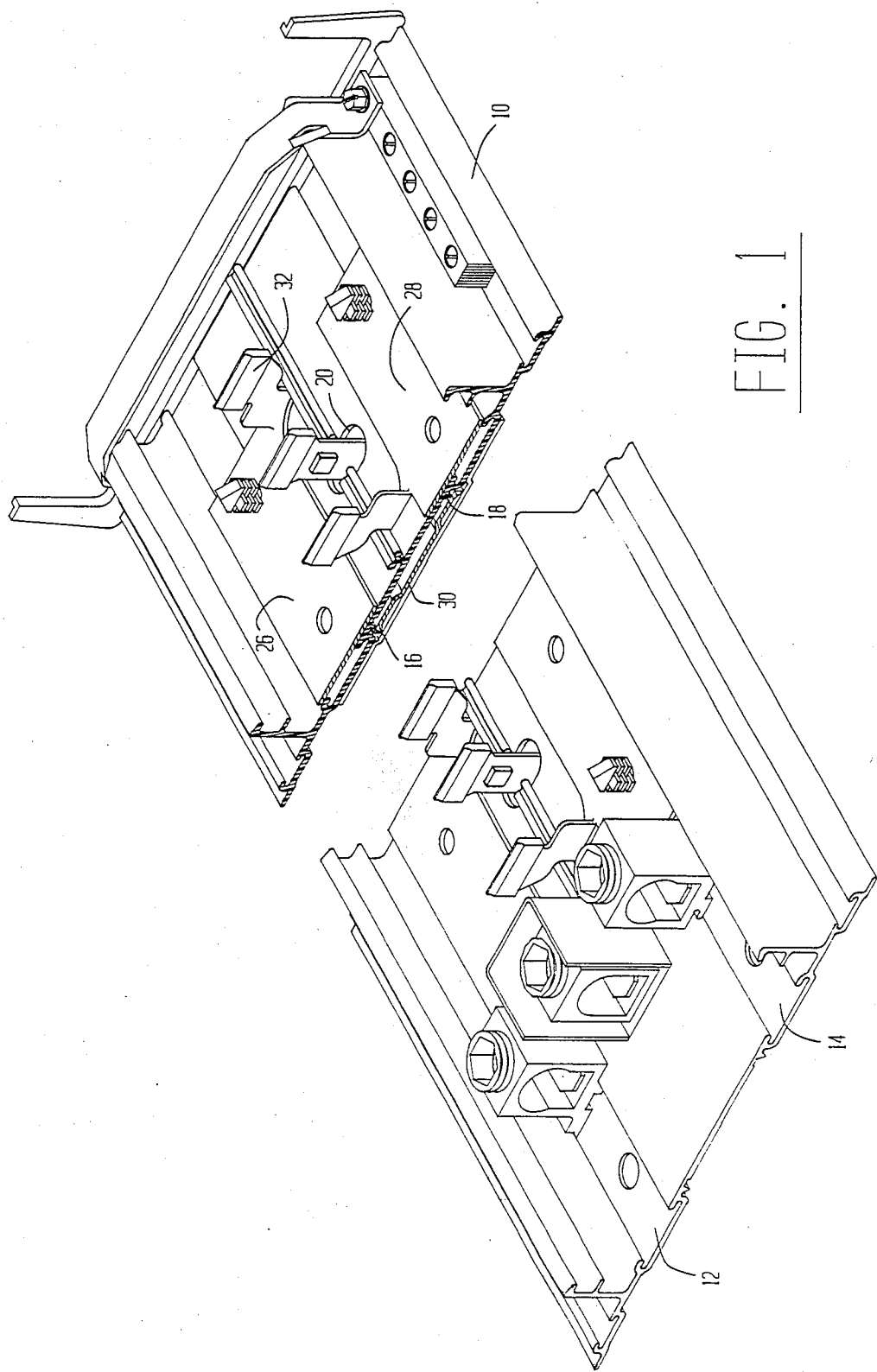
FIG. 1 is an isometric view of a three-phase load center with the metal enclosure removed and with a section removed revealing the relationship between the base pan and the bus bars.
Figure 2:
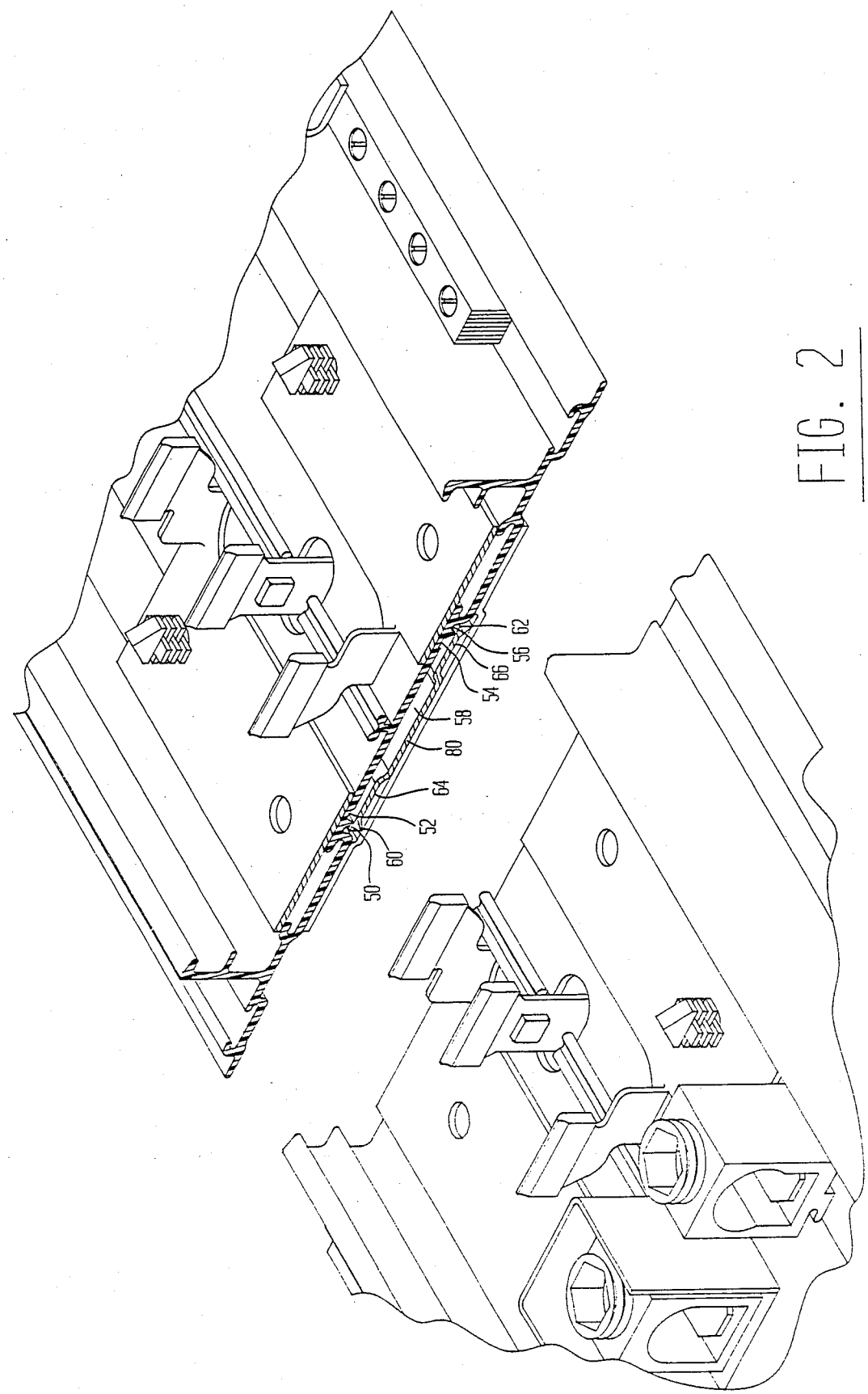
FIG. 2 is a somewhat enlarged sectional view of the load center of FIG. 1 further illustrating the base pan and bus bars.
Figure 3:
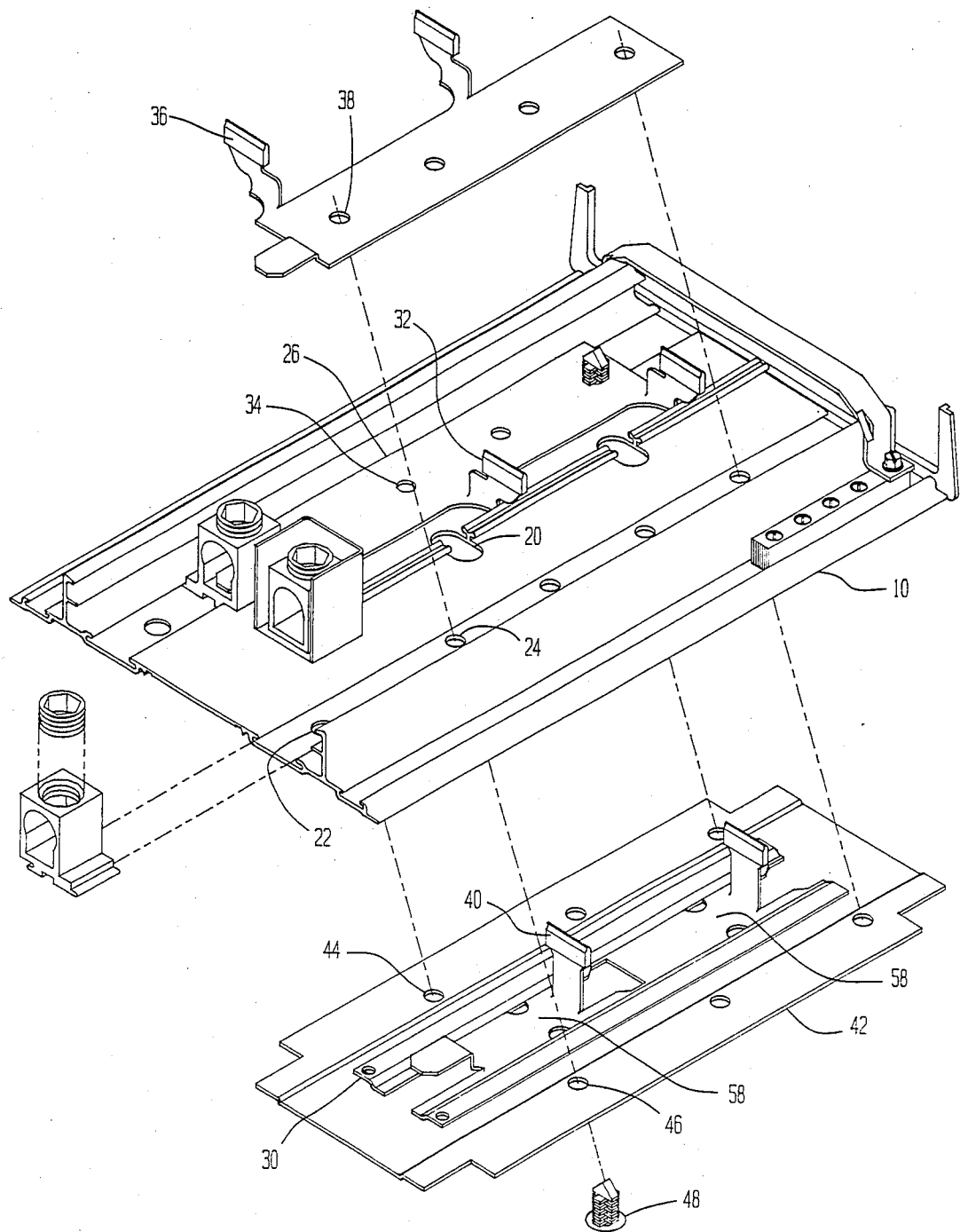
FIG. 3 is an exploded view of the three-phase load center of FIG. 1.

Referring to FIGS. 1-3, a three-phase load center includes a base pan 10 which is preferably extruded from an insulative material as is known in the art. The base pan 10 has a top surface and a bottom surface. The top surface has first and second spaced apart C- or U-shaped channels 12, 14 formed therein which are useful for engaging entrance connectors and for forming air passageways which assist in cooling the components of the load center. The bottom surface has one or more ribs 16 formed thereon. There are preferably two ribs 16, 18 formed on the bottom surface of the base pan and these ribs 16, 18 are preferably positioned between the channels 12, 14. The base pan also has a slot 20 formed therein and first and second openings 22, 24. The openings 22, 24 are preferably formed in the first and second channels 12, 14. The three-phase load center also includes three bus bars 26, 28, 30 for the three phases of current distributed by the load center.

The first bus has an integrally formed upstanding stab 32 and an opening 34 and is positioned atop the first channel 12 on the top surface of the base pan 10 with the first bus bar opening 34 aligned with the first base pan opening 22. The second bus bar 28 also has an integrally formed upstanding stab 36 and an opening 38 and is positioned atop the second channel 14 on the top surface of the base pan 10 with the second bus bar opening 38 aligned with the second base pan openings 24. The first and second bus bars are electrically isolated form one another. The third bus bar 30 has a periphery and an integrally formed upstanding stab 40 and is positioned beneath the base pan 10 in contact with the ribs 16, 18 on the bottom surface of the base pan with the stab 40 extending through the slot 20.

An isolator 42 has first and second openings 44, 46 aligned with the first and second base pan openings 22, 24 and is positioned in contact with the third bus bar 30. The insulator 42 is of a size sufficient for extending beyond the periphery of the third bus bar 30. Fastening means, such as bus bar fastener 48 extends through aligned openings 46, 24 and 38 forming a unitary structure. The bus bar fastener 48 is of a well-known type which includes an upper cross section design for simple snap-in installation. The fastener is further provided with circular ribs extending outwardly along the axis of the fastener and an end cap maintains the fastener on the outer side of the insulator 42. The fastener 48 can be formed of the same material as the insulator 42 and the insulative base pan 10.

As can be seen in the drawings, the bus bars have a thin, flat, oblong appearance and are preferably stamped from a sheet of conductive material such as copper or aluminum. By making the bus bars flat, the surface areas of the bus bars are increased which helps to dissipate heat. Also, the stabs are easily formed from such a sheet of material. The A and C phase bus bars 26, 28 are approximately the same dimensions and have approximately equal widths. The B phase bus bar 30 is wider than the other two bus bars and has a greater surface area. As is known in the art, the B phase will carry current equal to the current carried by the other two phases and thus requires the larger surface area to dissipate the additional heat given that the bus bars are of the same thicknesses. To facilitate the movement of air for cooling the bus bars, the bus bars 26 and 28 are positioned atop channels 12 and 14, respectively, forming ventilation passageways beneath the bus bars.

The base pan 10 also contributes to the formation of ventilation passageways by having longitudinally extending grooves 50, 52, 54, 56 formed in the bottom surface of the base pan. The ribs preferably extend longitudinally parallel to the ribs 16, 18 forming ventilation passageways between the third bus bar 30 and the base pan 10. Preferably, the grooves 50, 52, 54, 56 re located adjacent the ribs 16, 18 with a groove outboard of each rib and at least one groove inboard of each rib.

The third bus bar 30 is preferably equipped with ribs and grooves also. Preferably, the third bus bar 30 has a top surface with a centrally located longitudinal groove 58 therein which provides a ventilation passageway between the base pan 10 and the third bus bar 30. The width of the longitudinal groove 58 will depend upon various conditions such as the anticipated temperature rise and the projected air flow. Thus, there may be one wide central groove 58 or there may be a plurality of smaller longitudinal grooves. The groove 58 in conjunction with the ribs 16 and 18 help provide a passageway between the top of the third bus bar 30 and the bottom of the base pan 10 for the passage of air for ventilation. The bottom of the third bus bar can also contain a groove or a combination of ribs and grooves. As shown, the third bus 30 has a bottom surface with first and second longitudinally extending ribs 60, 62 and first and second longitudinally extending grooves 64, 66 extending the length of the bus bar parallel to the ribs 60, 62. The grooves 64, 66 form the sides of a central longitudinal rib 80. While only two ribs and two grooves are shown on the bottom surface of the bus bar, it is evident that there could be a plurality of such ribs and grooves depending upon the particular ventilation requirements. Also, the ribs and grooves need not extend the full length of the base pan although it is easier to extrude full length ribs and grooves than other configurations.

The third bus bar 30 is positioned between the bottom of the base pan 10 and the top of the bottom insulator 42. The base pan 10, the bottom insulator 42 and the third bus bar 30 cooperate to form ventilation passageways. To enhance heat removal from the bus bar 30, the base pan 10 and bottom insulator 42 have heat conduction properties such that they can conduct heat away from the bus bars 26, 28, 30.

When a load center is installed in a metal load center enclosure (not shown), the bottom insulator 42 can be placed in contact with the back wall of the metal enclosure. when in contact with the back wall of the metal enclosure, the bottom insulator 42 transfers heat to the back wall. In addition, the depth of the load center if reduced by placing the bottom insulator 42 in contact with the back wall of the metal enclosure. The bottom surface of the bottom insulator can also have ribs and grooves to form ventilation passageways between the bottom insulator and the back wall of the metal enclosure.

Figure 4:
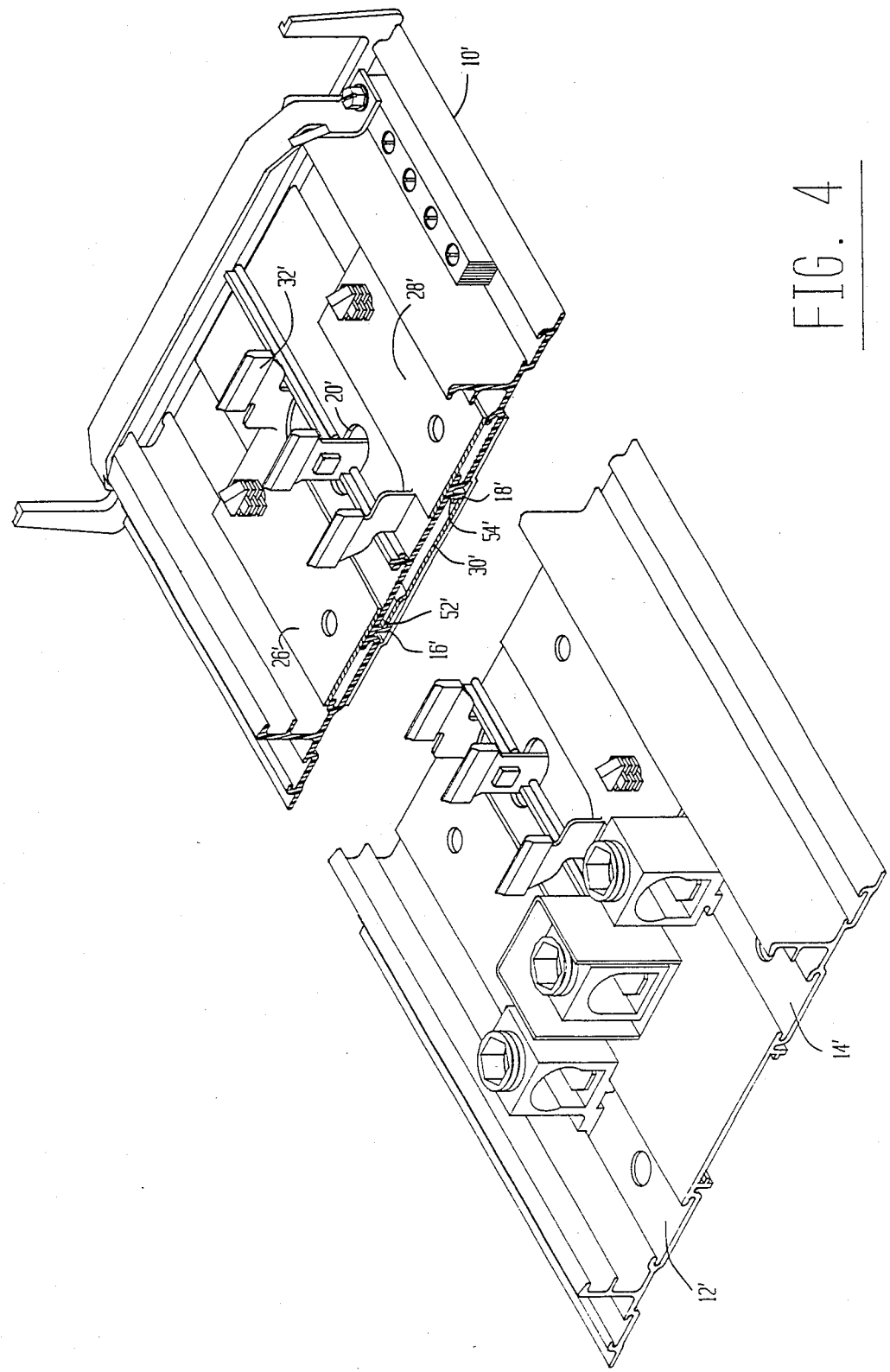
FIG. 4 is a view similar to FIG. 1 but illustrating another embodiment.
Figure 5:
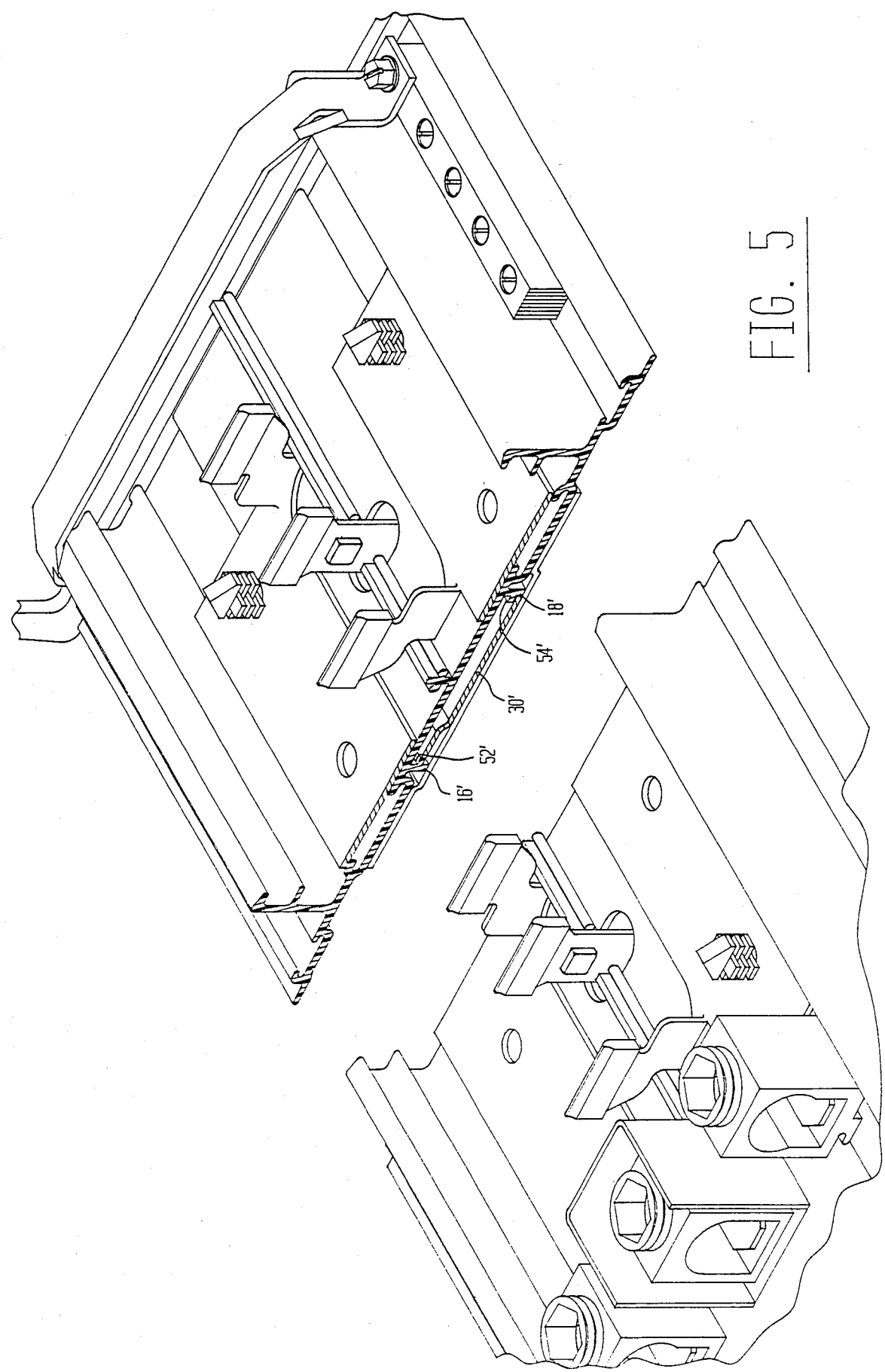
FIG. 5 is a view similar to FIG. 2 but illustrating the embodiment of FIG. 4.
Figure 6:
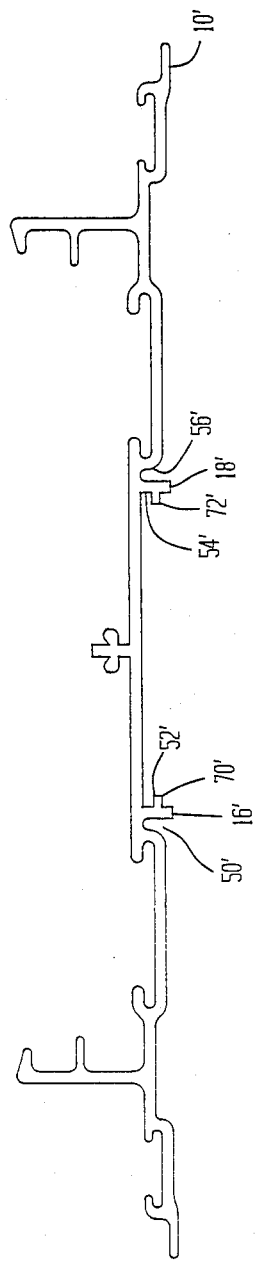
FIG. 6 is a cross-sectional view of the base pan of the alternate embodiment of FIGS. 4 and 5.

Referring to FIGS. 4-6, another embodiment of the invention is illustrated which uses a different base pan configuration. The base pan configuration is more fully described in copending application having Ser. No. 06/925,996. The bus bar 30' has indentations thereon which are engageable by the ribs 16', 18' for positioning the bus bar 30'. The outboard grooves 50', 56' are positioned adjacent the ribs 16', 18', respectively, as before. In the alternate embodiment, each of the ribs 16', 18' has a lip 70', 72' which extends the length of the rib. The grooves 52' is located adjacent the lip 70' between the lip 70' and the bottom of the base pan 10'.

Similarly, the groove 54' is located adjacent the lip 72' between the lip 72' and the bottom of the base pan 10'. The grooves 70' and 72' are positioned so that they face one another. The lips 70', 72' have a size sufficient for engaging the top surface of the third bus bar 30' so that the base pan rests on top of the third bus bar 30'. In this manner, a ventilation passageway is maintained between the ribs 16', 18', the top surface of the third bus bar 30' and the bottom surface of the base pan 10'.

Operation and assembly of the load center is simple and straightforward. Assembly can be accomplished by inserting fasteners into the back insulator and placing the same on a work surface. The third bus bar is then placed on top of the back insulator and the base pan is placed over the bus bar so that the bus bar stabs extend vertically upward through the openings in the base pan provided for the stabs. At this point, the longitudinal ribs of the base pan should be spaced approximately equal distance from the longitudinal edges of the third bus bar. In the alternate embodiment, the lips of the ribs may rest on top of the third bus bar or the lips may lie adjacent the longitudinal edges of the bus bar depending upon the particular construction configuration used. The fasteners also extend vertically upward through openings provided in the base plate.

The first and second phases can now be installed by aligning openings in each of the bus bars with the fasteners and pushing the bus bars down onto the fasteners to provide a snug fit. The holes provided for the fasteners are made to close tolerances so that the parts mounted on the fasteners are self-aligning. Once assembled, the ventilation passageways are automatically formed between the bottom of the base plate and the top surface of the third bus bar. Ventilation passageways are also formed beneath each of the first and second bus bars in the spaces provided by the channels of the base pan.

It will now be understood that there has been presented a three-phase load center which provides ventilation passageways for each of the three phases and which is assembled in a closely spaced compact arrangement. Even though the assembly is somewhat compact, adequate ventilation is provided by the ventilation passageways formed by the cooperation of the ribs and grooves. Also, since the third bus bar rests on the back insulator which is a heat conducting material, heat is also dissipated through the back of the load center.

As will be evident from the foregoing description, certain aspects of the invention are not limited to the particular details of the examples illustrated and it is therefore contemplated that other modifications or applications will occur to those skilled in the art. Since the parts are self-aligning during assembly, the assembly process can be automated. It is accordingly intended that the claims shall cover all such modifications and applications as do not depart from the true spirit and script of the invention.

What is claimed as new and desired to be secured by Letters Patent of the United States is:

1. A three-phase load center comprising:
    an insulative base pan defining a top surface, a bottom surface, a slot, a first opening and a second opening, the top surface having a first and a second channel formed therein and the bottom surface having a first rib and a second rib formed thereon between the channels;
    a first bus bar having an integrally formed upstanding stab and an opening, the first bus bar being positioned above the first channel, wherein the opening is aligned with the first opening;
    a second bus bar having an integrally formed upstanding stab and an opening, the second bus bar being positioned above the second channel, wherein the second bus bar opening is aligned with the second opening, the second bus bar being electrically isolated from the first bus bar;
    a third bus bar having a periphery and an integrally formed upstanding stab, the third bus bar being positioned beneath the base pan in contact with the ribs on the bottom surface of the base pan with the stab extending through the slot;
    an insulator having a first opening and a second opening, the insulator being positioned such that the first opening is aligned with the first base pan opening and the second opening is aligned with the second base pan opening, wherein the insulator is positioned in contact with the third bus bar and extending beyond the periphery of the third bus bar; and
    means for fastening the bus bars and the insulator to the insulative base pan.

2. The three-phase load center of claim 1 further comprising:
    a first groove and a second groove positioned between the first rib and the second rib and extending substantially parallel to the ribs, the grooves forming a ventilation passageway between the third bus bar and the base pan.

3. The three phase-load center of claim 1, further comprising;
    a first groove and a second groove adjacent to the first rib and the second rib respectively and extending parallel to the ribs, the grooves forming a ventilation passageway between the third bus bar and the base pan.

4. A three-phase load center according to claim 1, including a first groove formed in the first rib and a second groove formed in the second rib.

5. A three-phase load center according to claim 4, wherein the grooves are positioned between the ribs facing one another.

6. A three-phase load center according to claim 1, wherein the third bus bar has a top surface with a centrally located longitudinal groove therein providing a ventilation passageway between the base pan and the third bus bar.

7. A three-phase load center according to claim 1, wherein the third bus bar has a bottom surface and edge portions and longitudinal ribs formed on the bottom surface adjacent the edge portions.

8. A three-phase load center according to claim 7, including a groove formed in the bottom surface of the third bus bar extending parallel to the ribs.

9. A three-phase load center according to claim 8, wherein the groove is positioned between the ribs.

10. A three phase load center according to claim 1, wherein the third bus bar has a bottom surface defining a rib thereon.

* * * * *